United States Patent
Yang et al.

(10) Patent No.: US 10,241,610 B2
(45) Date of Patent: Mar. 26, 2019

(54) ARRAY SUBSTRATE AND DRIVING METHOD THEREOF, DISPLAY PANEL AND DISPLAY DEVICE

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Shengji Yang, Beijing (CN); Xue Dong, Beijing (CN); Haisheng Wang, Beijing (CN); Xiaochuan Chen, Beijing (CN); Yingming Liu, Beijing (CN); Weijie Zhao, Beijing (CN); Changfeng Li, Beijing (CN); Jiantao Liu, Beijing (CN); Lei Wang, Beijing (CN); Rui Xu, Beijing (CN); Hongjuan Liu, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 15/300,008

(22) PCT Filed: Oct. 30, 2015

(86) PCT No.: PCT/CN2015/093398
§ 371 (c)(1),
(2) Date: Sep. 28, 2016

(87) PCT Pub. No.: WO2016/201858
PCT Pub. Date: Dec. 22, 2016

(65) Prior Publication Data
US 2017/0115811 A1    Apr. 27, 2017

(30) Foreign Application Priority Data

Jun. 18, 2015    (CN) .......................... 2015 1 0342538

(51) Int. Cl.
*G06K 9/00*        (2006.01)
*G09G 3/36*        (2006.01)
(Continued)

(52) U.S. Cl.
CPC ............ *G06F 3/0416* (2013.01); *G06F 3/042* (2013.01); *G06F 3/044* (2013.01); *G06F 3/0412* (2013.01);
(Continued)

(58) Field of Classification Search
CPC ...... G06F 3/0412; G06F 3/0416; G06F 3/044; G06F 3/042–3/0428; G06K 9/00006–9/0002
See application file for complete search history.

(56) References Cited

U.S. PATENT DOCUMENTS 4,686,332 A    8/1987  Greanias et al.
8,537,124 B2 *  9/2013  Lee ..................... G02F 1/13338
                                                   178/18.09
(Continued)

FOREIGN PATENT DOCUMENTS

CN    101587400 A        11/2009
CN    103218076 A  *   7/2013  ........... G06F 3/0412
(Continued)

OTHER PUBLICATIONS

The First Chinese Office Action dated May 25, 2017: Appln. No. 201510342538.5.
(Continued)

*Primary Examiner* — Patrick F Marinelli
(74) *Attorney, Agent, or Firm* — Ladas & Parry LLP (57) ABSTRACT

An array substrate and a driving method thereof, a display panel and a display device. The array substrate includes a
(Continued)

plurality of areas. Each area at least includes a first subpixel and a second subpixel, and each subpixel includes a corresponding display unit; the first subpixel includes a photosensitive identification unit, the photosensitive identification unit is connected with a read signal line and is configured to acquire and store position information of a touch position and transmit the acquired position information to the read signal line; and the second subpixel includes a capacitive detection unit, the capacitive detection unit is connected with the read signal line and is configured to acquire information of a touch object and transmit the acquired information of the touch object to the read signal line. The display device has a function of touch object identification (e.g., palm print identification) and has a simple structure.

20 Claims, 6 Drawing Sheets

(51) Int. Cl.
    *G06F 3/041*    (2006.01)
    *G06F 3/042*    (2006.01)
    *G06F 3/044*    (2006.01)
    *G02F 1/1362*   (2006.01)

(52) U.S. Cl.
    CPC ....... *G06K 9/0002* (2013.01); *G06K 9/00087* (2013.01); *G09G 3/3648* (2013.01); *G02F 1/1362* (2013.01); *G09G 3/3655* (2013.01); *G09G 2300/0809* (2013.01); *G09G 2354/00* (2013.01); *G09G 2360/14* (2013.01)

(56) References Cited

U.S. PATENT DOCUMENTS

| | | | | |
|---|---|---|---|---|
| 9,507,463 | B2* | 11/2016 | Yang | G06F 3/0412 |
| 9,704,011 | B2* | 7/2017 | Yang | G06K 9/0002 |
| 9,740,325 | B2* | 8/2017 | Yang | G06F 3/042 |
| 9,934,421 | B1* | 4/2018 | Nilsson | G06K 9/0012 |
| 2005/0134751 | A1* | 6/2005 | Abileah | G02F 1/13338 349/42 |
| 2007/0216657 | A1* | 9/2007 | Konicek | G06F 3/0412 345/173 |
| 2010/0039406 | A1* | 2/2010 | Lee | G02F 1/13338 345/174 |
| 2015/0205440 | A1* | 7/2015 | Yang | G06F 3/0412 345/174 |
| 2016/0042216 | A1* | 2/2016 | Yang | G06K 9/0002 382/124 |
| 2016/0132712 | A1* | 5/2016 | Yang | G06K 9/0002 348/77 |
| 2016/0148036 | A1* | 5/2016 | Kim | G06K 9/0002 382/124 |
| 2016/0274719 | A1* | 9/2016 | Yang | G06F 3/042 |
| 2016/0349882 | A1* | 12/2016 | Liu | G06F 3/044 |
| 2017/0115811 | A1* | 4/2017 | Yang | G06F 3/044 |
| 2018/0173343 | A1* | 6/2018 | Pi | A61B 5/02416 |
| 2018/0211078 | A1* | 7/2018 | Lillie | G06K 9/0002 |
| 2018/0260056 | A1* | 9/2018 | Chang | G06F 3/044 |

FOREIGN PATENT DOCUMENTS

| | | |
|---|---|---|
| CN | 104155785 A | 11/2014 |
| CN | 104881195 A | 9/2015 |
| CN | 204679996 U | 9/2015 |

OTHER PUBLICATIONS

International Search Report and Written Opinion dated Feb. 29, 2016; PCT/CN2015/093398.

* cited by examiner

| In a first period of each frame, inputting scanning signals into the display scanning lines Scan1 row by row, inputting data signals DL into the data lines, charging the display unit 101, and resetting the capacitive detection unit 103 under the control of the display scanning lines Scan1 and the common voltage ports Vcom | ─S10 |

| In a second period of a first frame, inputting signals into the common voltage ports Vcom, acquiring and storing a palm position by the photosensitive identification units 102, inputting scanning signals into the identification scanning lines Scan2 row by row, transmitting the acquired position information to corresponding read signal lines RL, and determining the palm position | ─S11 |

| In a second period of a second frame, inputting scanning signals into the detection scanning lines within a range of the palm position, acquiring palm print information and transmitting the acquired palm print information to the corresponding read signal lines RL by the capacitive detection units 103, and finishing palm print identification | ─S12 |

Fig. 6

ARRAY SUBSTRATE AND DRIVING METHOD THEREOF, DISPLAY PANEL AND DISPLAY DEVICE

TECHNICAL FIELD

Embodiments of the present disclosure relate to an array substrate and a driving method thereof, a display panel and a display device.

BACKGROUND

Liquid crystal displays (LCD) are widely applied in electronic products such as tablet PCs, TVs and mobile phones due to advantages such as low radiation, small size, low energy consumption, etc.

In addition, the technical field of palm print identification has been fully accepted in academy since created by the Hong Kong Polytechnic University and the Tsinghua University in the late 1990s, and has great significance in enhancing security and expanding application scopes of electronic equipments.

However, most current LCDs do not have the function of palm print identification, or they achieve the purpose of palm print identification by using an external independent palm print identification circuit, leading to a complex structure and increased cost.

SUMMARY

Embodiments of the present disclosure provide an array substrate and a driving method thereof, a display panel and a display device, where the display device has a function of identifying information of a touch object (e.g., palm print information) and has a simple structure.

For example, embodiments of the disclosure provide an array substrate, comprising a plurality of areas, where each area at least includes a first subpixel and a second subpixel, and each subpixel includes a corresponding display unit; the first subpixel includes a photosensitive identification unit, the photosensitive identification unit is connected with a read signal line and is configured to acquire and store position information of a touch position and transmit the acquired position information to the read signal line; and the second subpixel includes a capacitive detection unit, the capacitive detection unit is connected with the read signal line and is configured to acquire information of a touch object and transmit the acquired information of the touch object to the read signal line.

For example, the first subpixel further includes a first display unit which is connected with a first display scanning line, a first data line and a common voltage port, and the first display unit is configured to store a data signal inputted into the first data line under the control of the first display scanning line and the common voltage port; the second subpixel further includes a second display unit which is connected with a second display scanning line, a second data line and the common voltage port, and the second display unit is configured to store a data signal inputted into the second data line under the control of the second display scanning line and the common voltage port; the photosensitive identification unit is also connected with an identification scanning line and the common voltage port, and is configured to acquire and store the position information of the touch position under the control of the common voltage port and transmit the acquired position information to the read signal line under the control of the identification scanning line; and the capacitive detection unit is also connected with a third display scanning line, a detection scanning line and the common voltage port, and is configured to reset under the control of the third display scanning line and the common voltage port, acquire the information of the touch object under the control of the detection scanning line, and transmit the acquired information of the touch object to the read signal line.

For example, each display unit includes a first transistor and a first capacitor; a gate electrode of the first transistor is connected with a corresponding display scanning line; a first end of the first transistor is connected with a corresponding data line; a second end of the first transistor is connected with one end of the first capacitor; and another end of the first capacitor is connected with the common voltage port.

For example, the photosensitive identification unit includes a second transistor, a third transistor and a second capacitor; both a gate electrode and a first end of the second transistor are connected with the common voltage port, and a second end of the second transistor is connected with one end of the second capacitor; a gate electrode of the third transistor is connected with the identification scanning line; a first end of the third transistor is connected with one end of the second capacitor; a second end of the third transistor is connected with the read signal line; another end of the second capacitor is connected with the common voltage port; and the second transistor is a photosensitive transistor.

For example, the capacitive detection unit includes a fourth transistor, a fifth transistor, a sixth transistor, a third capacitor and a detection electrode; a gate electrode of the fourth transistor is connected with the third display scanning line; a first end of the fourth transistor is connected with the common voltage port; a second end of the fourth transistor is connected with one end of the third capacitor; a gate electrode of the fifth transistor is connected with one end of the third capacitor; a first end of the fifth transistor is connected with the common voltage port; a second end of the fifth transistor is connected with a first end of the sixth transistor; a gate electrode of the sixth transistor is connected with the detection scanning line, and a second end of the sixth transistor is connected with the read signal line; the detection electrode is connected with one end of the third capacitor; another end of the third capacitor is connected with the third display scanning line; and the fifth transistor is an amplifier transistor.

For example, the third display scanning line connected with the capacitive detection unit is any scanning line in a corresponding area.

For example, the second display scanning line connected with the second display unit and the third display scanning line connected with the capacitive detection unit are different display scanning lines; or the second display scanning line connected with the second display unit and the third display scanning line connected with the capacitive detection unit are a same scanning line.

For example, the first display scanning line connected with the first display unit and the third display scanning line connected with the capacitive detection unit are different display scanning lines; or, the first display scanning line connected with the first display unit and the third display scanning line connected with the capacitive detection unit are a same scanning line.

For example, the first data line and the second data line are different data lines; or, the first data line and the second data line are a same data line.

For example, embodiments of the disclosure provide a display panel, comprising the above array substrate.

For example, embodiments of the disclosure provide a display device, comprising the above display panel and a signal receiving device connected with the read signal line, where the signal receiving device is configured to receive the position information and the information of the touch object outputted by the read signal line.

For example, embodiments of the disclosure provide a driving method for driving the array substrate, comprising: in a first period of each frame, inputting scanning signals into display scanning lines row by row, inputting data signals into data lines to charge corresponding display units, and resetting capacitive detection units under the control of common voltage ports and display scanning lines connected with the capacitive detection units; in a second period of a first frame, inputting signals into the common voltage ports, acquiring and storing position information of a touch position by photosensitive identification units, inputting scanning signals into identification scanning lines row by row, and transmitting the acquired position information to read signal lines for determination of the touch position; and in a second period of a second frame, inputting scanning signals into detection signal lines within a range of the touch position, acquiring information of a touch object and transmitting the acquired information of the touch object to the read signal lines by capacitive detection units, and finishing identification of the touch object.

For example, in the first period of each frame, when the scanning signals are inputted into the respective display scanning lines row by row, first transistors connected with the respective display scanning lines are switched on, and first capacitors are charged by signals inputted through the corresponding data lines; and when the scanning signals are inputted into corresponding display scanning lines connected with the capacitive detection units, fourth transistors are switched on, and third capacitors are reset by voltages on the common voltage ports through the fourth transistors.

For example, in the second period of the first frame, signals are inputted into the common voltage ports, and second transistors are switched on; in a case of covering by the touch object, electric potential differences of second capacitors are varied; scanning signals are inputted into the identification scanning lines row by row, and third transistors are switched on; signals indicating the electric potential differences are transmitted to the read signal lines through the third transistors; and the touch position is determined.

For example, the touch position is a palm position, and the information of the touch object is palm print information; in the second period of the second frame, coupling capacitors are formed between concave portions of the palm print and a detection electrode to cause fifth transistors to be switched on; or, coupling capacitors are formed between convex portions of the palm print and the detection electrode to cause the fifth transistors to be switched off; when scanning signals are inputted into detection scanning lines within the range of the palm position, sixth transistors are switched on; when the fifth transistors are switched on, signals inputted through the common voltage ports are amplified by the fifth transistors and transmitted to the read signal lines through the sixth transistors; and when the fifth transistors are switched off, initial current signals at second ends of the fifth transistors are transmitted to the read signal lines through the sixth transistors, and palm print identification is finished.

The embodiments of the present disclosure provide an array substrate and a driving method thereof, a display panel and a display device. Data signals are inputted into the display units through data lines under the control of the display scanning lines, so that normal image display can be guaranteed when the array substrate is applied in a display device. Under the control of an identification scanning line and through a voltage signal inputted through a common voltage port, the photosensitive identification unit 102 may acquire position information of a touch object (e.g., a palm) and transmit the position information to the read signal line, and hence can achieve the objective of identification of the object position (e.g., palm position). On this basis, the capacitive detection unit 103 may acquire touch object information (e.g., palm print information) under the control of the detection scanning line within the palm position range, transmit the acquired palm print information to the read signal line, and hence achieve the objective of palm print identification. Therefore, in one aspect, the photosensitive identification units and the capacitive detection units are integrated on the array substrate, so that the array substrate can have the function of palm print identification. When the array substrate is applied in a display device, the display device may have a simple structure. In another aspect, as the palm position information may be acquired by the photosensitive identification units, palm print identification may be only needed to be performed within a range of the palm position, so that the time of palm print identification can be shortened.

BRIEF DESCRIPTION OF THE DRAWINGS

In order to illustrate the technical solutions in the embodiments of the present disclosure more clearly, the drawings need to be used in the description of the embodiments will be briefly described in the following; it is obvious that the drawings described below are only related to some embodiments of the present disclosure, for one ordinary skilled person in the art, other drawings can be obtained according to these drawings without making other inventive work.

DETAILED DESCRIPTION

Hereafter, the technical solutions of the embodiments of the present disclosure will be described in a clearly and fully understandable way in connection with the drawings related to the embodiments of the disclosure. It is obvious that the described embodiments are just a part but not all of the embodiments of the present disclosure. Based on embodiments of the present disclosure, all other embodiments obtained by those skilled in the art without making other inventive work should be within the scope of the present disclosure.

In embodiments of the present disclosure, a touch object may be a palm, a finger or another object, and correspondingly, information of the touch object may be palm print information, fingerprint information or relevant information of the other object. For instance, description will be given below to the embodiments of the present disclosure by taking a palm as an example for the touch object. However, the embodiments of the present disclosure may also be applied in the identification of other example touch objects.

Figure 1:
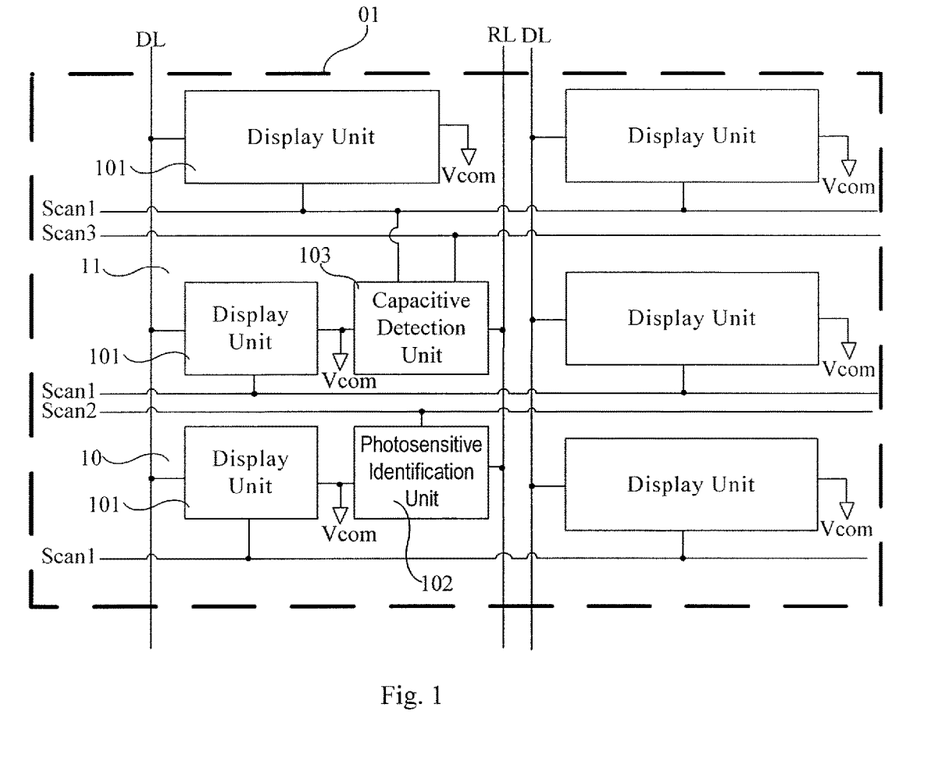
FIG. 1 is a schematic structural view of an array substrate provided by an embodiment of the present disclosure.

The embodiments of the present disclosure provide an array substrate. As illustrated in FIG. 1, the array substrate comprises a plurality of areas 01. Each area 01 at least includes a first subpixel 10 and a second subpixel 11; each subpixel includes a display unit 101; the first subpixel 10 further includes a photosensitive identification unit 102; and the second subpixel 11 further includes a capacitive detection unit 103.

For instance, each display unit 101 in the area 01 is connected with a corresponding display scanning line Scan1, a corresponding data line DL and a common voltage port Vcom, and is configured to store a data signal inputted by the corresponding data line DL under the control of the corresponding display scanning line Scan1 and the common voltage port Vcom.

The photosensitive identification unit 102 is connected with an identification scanning line Scan2, a read signal line RL and a common voltage port Vcom. The photosensitive identification unit 102 is configured to acquire and store a palm position under the control of the common voltage port Vcom and to transmit the acquired position information to the read signal line RL under the control of the identification scanning line Scan2.

The capacitive detection unit 103 is connected with a display scanning line Scan1, a detection scanning line Scan3, the read signal line RL and a common voltage port Vcom. The capacitive detection unit 103 is configured to reset under the control of the display scanning line Scan1 and the common voltage port Vcom, acquire palm print information under the control of the detection scanning line Scan3, and transmit the acquired palm print information to the read signal line RL.

For instance, the first subpixel 10 includes a photosensitive identification unit 102 and a first display unit 101, where the first display unit 101 is connected with a first display scanning line Scan1. The second subpixel 11 includes a capacitive detection unit 103 and a second display unit 101, where the second display unit 101 is connected with a second display scanning line Scan1, and the capacitive detection unit 103 is connected with a third display scanning line Scan1. In some embodiments, the third display scanning line Scan1 connected with the capacitive detection unit 103 may be any display scanning line Scan1 in the area 01. For instance, the third display scanning line Scan1 connected with the capacitive detection unit 103 is different from the second display scanning line Scan1 connected with the second display unit 101 in the second subpixel 11 (for instance, as illustrated in FIG. 1, for the convenience of manufacture, the third display scanning line Scan1 may be a display scanning line Scan1 disposed above the second display scanning line Scan1); or, the third display scanning line Scan1 connected with the capacitive detection unit 103 and the second display scanning line Scan1 connected with the second display unit 101 may be the same scanning line. Moreover, for instance, the third display scanning line Scan1 connected with the capacitive detection unit 103 is different from the first display scanning line Scan1 connected with the first display unit 101 in the first subpixel 10; or, the third display scanning line Scan1 connected with the capacitive detection unit 103 and the first display scanning line Scan1 connected with the first display unit 101 may be the same scanning line.

It should be noted that: firstly, each area may only include one first subpixel 10 and one second subpixel 11, and may also include a plurality of third subpixels besides one first subpixel 10 and one second subpixel 11. Each third subpixel, for instance, includes one display unit 101. The embodiment can be achieved as long as position information of the palm can be acquired by the photosensitive identification unit 102 and palm print information can be acquired by the capacitive detection unit 103.

Secondly, the palm print information is related to concave portions (valley lines) and convex portions (crest lines) of the palm.

The number of the third subpixels in each area may be selected based on a distance between adjacent crest lines, a distance between adjacent valley lines, and a size of the subpixel.

The embodiments of the present disclosure provide an array substrate. Data signals are inputted into the display units 101 through data lines under the control of the display scanning lines, so that normal image display can be guaranteed when the array substrate is applied in a display device. Under the control of an identification scanning line and through a voltage signal inputted through a common voltage port, the photosensitive identification unit 102 may acquire position information of a palm and transmit the position information to the read signal line, and hence can achieve the objective of palm position identification. On this basis, the capacitive detection unit 103 may acquire palm print information under the control of the detection scanning line within the palm position range, transmit the acquired palm print information to the read signal line, and hence achieve the objective of palm print identification. Therefore, in one aspect, the photosensitive identification unit 102 and the capacitive detection unit 103 are integrated on the array substrate, so that the array substrate can have the function of palm print identification. When the array substrate is applied in a display device, the display device may have a simple structure. In another aspect, as the palm position information may be acquired by the photosensitive identification unit 102, palm print identification may be only needed to be performed within a range of the palm position, so that the time of palm print identification can be shortened.

Figure 2:
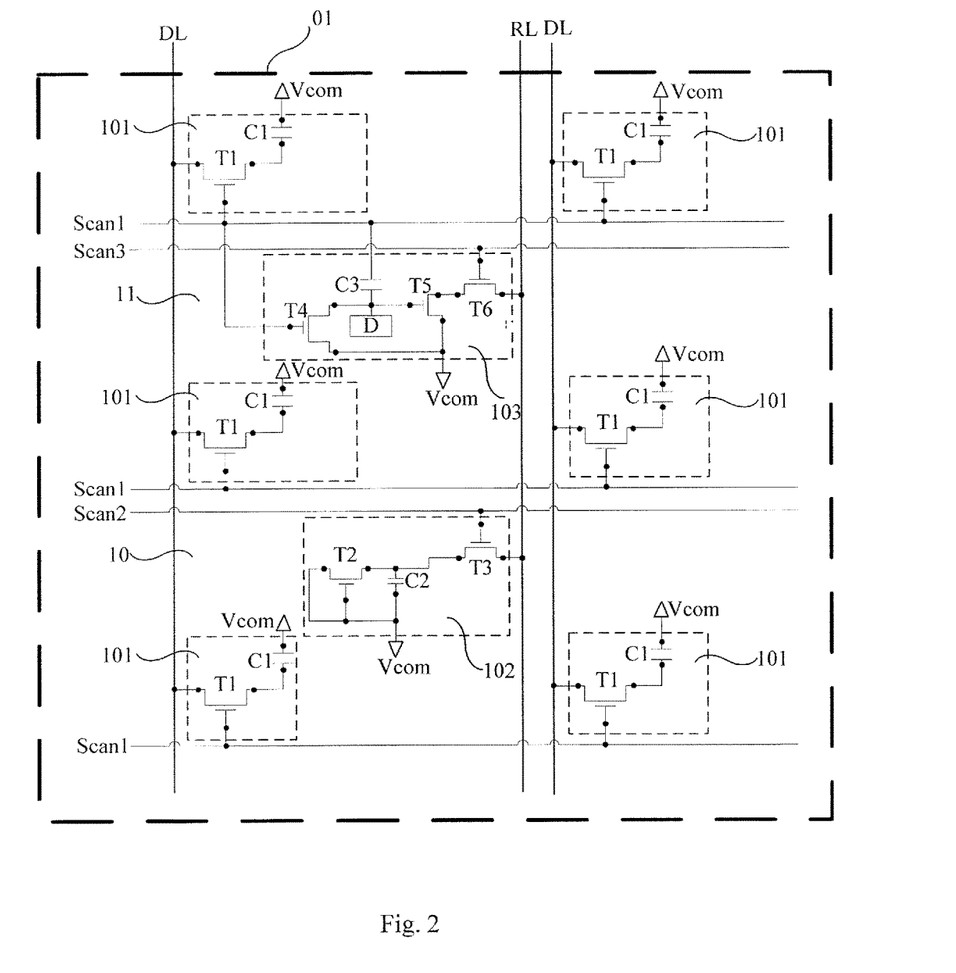
FIG. 2 is a schematic view of a structure of each area in FIG. 1.

In one embodiment as shown in FIG. 2, each display unit 101 includes a first transistor T1 and a first capacitor C1.

A gate electrode of the first transistor T1 is connected with a display scanning line Scan1 corresponding to the display unit 101; a first end of the first transistor T1 is connected with a data line DL corresponding to the display unit 101; and a second end of the first transistor T1 is connected with one end of the first capacitor C1.

The other end of the first capacitor C1 is connected with the common voltage port Vcom.

It should be noted that the first capacitor C1 may be a liquid crystal capacitor formed by a pixel electrode and a common electrode, and may also be an equivalent capacitor formed by the liquid crystal capacitor (formed by the pixel electrode and the common electrode) and a storage capacitor. No limitation will be given here.

In addition, the display unit 101 may further include other structures having the same function as the display unit 101. No further description will be given here. But all the examples shall fall within the scope of protection of the present disclosure.

In one embodiment as shown in FIG. 2, the photosensitive identification unit 102 includes a second transistor T2, a third transistor T3 and a second capacitor C2, where the second transistor T2 is a photosensitive transistor.

Both a gate electrode and a first end of the second transistor T2 are connected with the common voltage port Vcom, and a second end of the second transistor T2 is connected with one end of the second capacitor C2.

A gate electrode of the third transistor T3 is connected with the identification scanning line Scan1; a first end of the third transistor T3 is connected with one end of the second capacitor C2; and a second end of the third transistor T3 is connected with the read signal line RL.

The other end of the second capacitor C2 is connected with the common voltage port Vcom.

It should be noted that the photosensitive identification unit 102 may further include a plurality of switching transistors that are in parallel connection with the third transistor T3, or includes a plurality of photosensitive transistors that are in parallel connection with the second transistor T2. The foregoing description is only one example of the photosensitive identification unit 102. No further description will be given to other structures having the same function as the photosensitive identification unit 102. But all the examples shall fall within the scope of protection of the present disclosure.

In one embodiment as shown in FIG. 2, the capacitive detection unit 103 includes a fourth transistor T4, a fifth transistor T5, a sixth transistor T6, a third capacitor C3 and a detection electrode D, where the fifth transistor T5 is an amplifier transistor.

A gate electrode of the fourth transistor T4 is connected with the display scanning line Scan1; a first end of the fourth transistor T4 is connected with the common voltage port Vcom; and a second end of the fourth transistor T4 is connected with one end of the third capacitor C3.

A gate electrode of the fifth transistor T5 is connected with one end of the third capacitor C3; a first end of the fifth transistor T5 is connected with the common voltage port Vcom; and a second end of the fifth transistor T5 is connected with a first end of the sixth transistor T6.

A gate electrode of the sixth transistor T6 is connected with the detection scanning line Scan3, and a second end of the sixth transistor T6 is connected with the read signal line RL.

The detection electrode D is connected with one end of the third capacitor C3.

The other end of the third capacitor C3 is connected with the display scanning line Scan1. For instance, both the other end of the third capacitor C3 and the gate electrode of the fourth transistor T4 are connected with the same display scanning line Scan1. The same display scanning line Scan1 may be any display scanning line Scan1 in the area 01.

It should be noted that the capacitive detection unit 103 may further include a plurality of switching transistors that are in parallel connection with the fourth transistor T4 or the sixth transistor T6. The foregoing description is only one example of the capacitive detection unit 103. No further description will be given to other structures having the same function as the capacitive detection unit 103. But all the examples shall fall within the scope of protection of the present disclosure.

In the embodiments of the present disclosure, all the transistors may be N-type transistors and may also be P-type transistors. Description is given in the embodiments of the present disclosure by taking the transistors as N-type transistors by way of examples.

A first end and a second end of a transistor are not limited in the present disclosure. The first end may be a drain electrode, and the second end may be a source electrode; or the first end may be a source electrode, and the second end may be a drain electrode. When the transistors are P-type transistors, as a source voltage of a P-type transistor is higher than a drain voltage, the first end is a source electrode and the second end is a drain electrode. When the transistors are N-type transistors, the case is just opposite to that of the P-type transistors.

In addition, in view of a low drain current of low-temperature polycrystalline silicon (LTPS) thin-film transistors (TFTs), in the embodiments of the present disclosure all the transistors can be LTPS TFTs.

As illustrated in FIG. 2, firstly, description is given to a working process of the display unit 101. In a display period, scanning signals are inputted into the display scanning lines Scan1 row by row; the first transistors T1 connected with the respective display scanning line Scan1 are switched on; one end (pixel electrode) of each first capacitors C1 is charged by a signal inputted through a corresponding data line DL, so that a voltage difference can be generated between one end of the first capacitor C1 and the other end (common electrode) of the first capacitor C1. Hence, liquid crystals can be driven to deflect for display when the array substrate is applied in the display device. Thus, when all the display scanning lines Scan1 are sequentially scanned, the display of one frame can be completed.

Meanwhile, as both the gate electrode of the fourth transistor T4 in the capacitive detection unit 103 and the other end of the third capacitor C3 are connected with the same display scanning line Scan1, when a signal is inputted into the display scanning line Scan1, the fourth transistor T4 is switched on, and the third capacitor C3 is discharged through the fourth transistor T4. Hence, the third capacitor C3 is reset.

Figure 3:
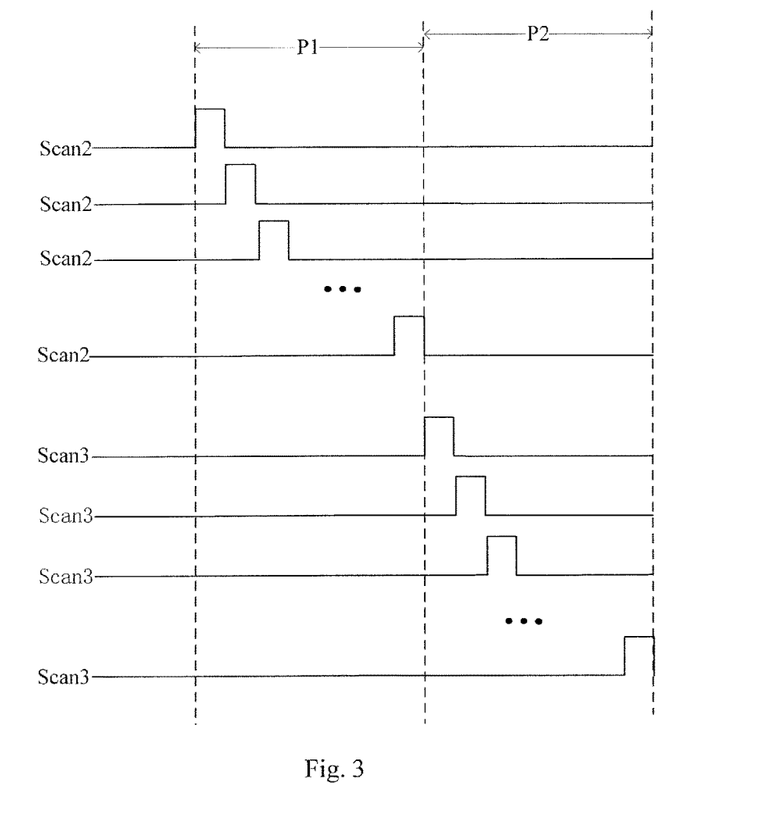
FIG. 3 is a timing sequence chart of scanning signals in a working process of a photosensitive identification unit and a capacitive detection unit.

Based on this, description is given to a working process of the photosensitive identification unit 102 and the capacitive detection unit 103. Description is given here by taking all the transistors to be N-type transistors by way of examples with reference to the timing sequence chart as shown in FIG. 3.

In a first period (P1), scanning signals are inputted into the identification scanning lines Scan2 row by row, and the third transistors T3 connected with the respective identification scanning lines Scan2 are switched on.

When a palm covers at a position corresponding to the photosensitive identification unit 102, the second transistor T2 (photosensitive transistor) receives light intensity variation, causing an electric potential of one end of the second capacitor C2 connected with the second end of the second transistor T2 to change. The signal of this change is transmitted to the read signal line RL through the third transistor T3, so that the signal can be transmitted through the read signal line RL to a signal receiving device for processing. Thus, it can determine that whether there is a palm covering at the position.

Here, the signal receiving device, for instance, may compare an electric potential difference value of the second transistor T2 caused by the receipt of the light intensity variation after the covering of the palm with a non-touch threshold, and hence determine whether there is a palm covering at the position. When there is a palm covering at the position, coordinates of the position may be determined by an identification scanning line Scan2 that is inputting signals currently and a read signal line RL that is outputting signals currently.

Thus, after all the identification scanning lines Scan2 are sequentially scanned, the palm position can be determined.

On this basis, as the palm position has been determined in the first period, when acquiring palm print information of the palm by the capacitive detection unit 103, signals may be only inputted into detection scanning lines Scan3 within a range of the palm position.

On this basis, in a second period (P2), scanning signals are inputted into detection scanning lines Scan3 within the range of the palm position row by row, and the sixth transistors T6 connected with the detection scanning lines Scan3 are switched on respectively.

Figure 4A:
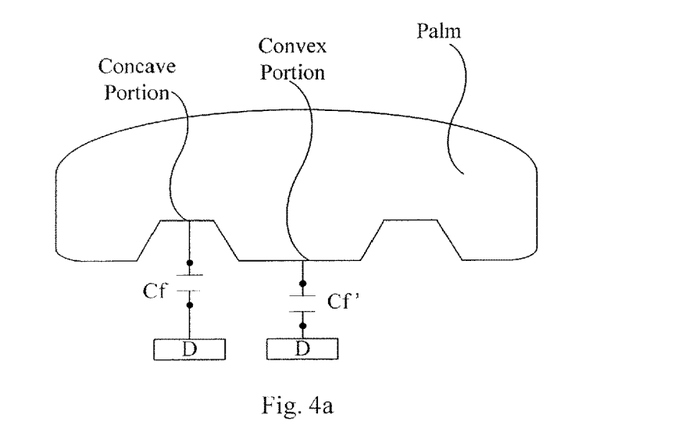
FIG. 4a is a schematic diagram of a capacitor formed between a concave portion and a detection electrode and a capacitor formed between a convex portion of the palm print and the detection electrode in the working process of the capacitive detection unit.
Figure 4B:
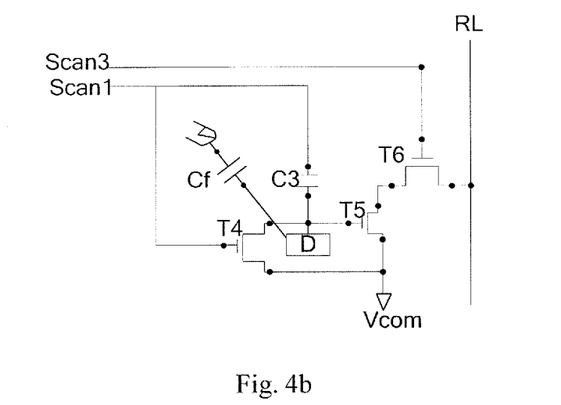
FIG. 4b is a schematic diagram illustrating acquisition of palm print information by the capacitive detection unit when the concave portion of the palm print in FIG. 4a makes contact with a screen.

When the palm makes contact with a screen, in the touch process as illustrated in FIG. 4a, a coupling capacitor Cf is formed between the concave portion (valley line) of the palm and the detection electrode D. On this basis, as illustrated in FIG. 4b, apart from the third capacitor C3 which serves as a reference capacitor in the capacitive detection unit 103, the fifth transistor T5 which has an amplifying function further includes a parasitic capacitor Ct. On this basis, as the coupling capacitor Cf is small enough compared with the third capacitor C3 and the parasitic capacitor Ct of the fifth transistor T5 having the amplifying function, as illustrated in FIG. 4b, the electric potential of the gate electrode of the fifth transistor T5 can be increased. As the fifth transistor T5 is an N-type transistor, the fifth transistor T5 is in an amplification turn-on state, and the signal on the common voltage port Vcom can be amplified by the fifth transistor T5 and transmitted to the read signal line RL through the sixth transistor T6 which is in a turn-on state.

Figure 4C:
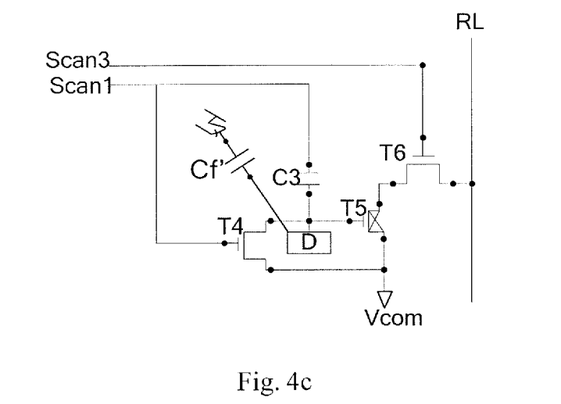
FIG. 4c is a schematic diagram illustrating acquisition of palm print information by the capacitive detection unit when the convex portion of the palm print in FIG. 4b makes contact with the screen.

Or, in the touch process as illustrated in FIG. 4a, a coupling capacitor Cf is formed between the convex portion (crest line) of the palm and the detection electrode D. On this basis, as illustrated in FIG. 4c, apart from the third capacitor C3 which serves as the reference capacitor in the capacitive detection unit 103, the fifth transistor T5 having an amplifying function further includes a parasitic capacitor Ct. On this basis, as the coupling capacitor Cf is large enough compared with the third capacitor C3 and the parasitic capacitor Ct of the fifth transistor T5 having the amplifying function, as illustrated in FIG. 4c, the electric potential of the gate electrode of the fifth transistor T5 can be reduced. As the fifth transistor T5 is an N-type transistor, the fifth transistor T5 is in a turn-off state. An initial current signal exists at the second end of the fifth transistor T5 and is transmitted to the read signal line RL through the sixth transistor T6 which is in a turn-on state.

Here, as the capacitive detection unit 103 has been reset in the display period, the influence of accumulated capacitance of the third capacitor C3 on the state of the fifth transistor T5 can be avoided in the working process of the capacitive detection unit 103.

Thus, when all the detection scanning lines Scan3 are sequentially scanned, the capacitive detection unit 103 completes the acquisition of the palm print information. The palm print information is related to the concave portions and the convex portions of the palm print. When there is an initial current signal at the second end of the fifth transistor T5, the acquired palm print information is a convex portion of the palm print; and when there is an amplified signal at the second end of the fifth transistor T5, the acquired palm print information is a concave portion of the palm print.

The detection scanning line Scan3 serves as a horizontal coordinate of the subpixel corresponding to the above palm print information (the concave portion or convex portion), and the read signal line RL serves as a vertical coordinate of the subpixel corresponding to the above palm print information (the concave portion or convex portion). A specific position on the screen corresponding to the palm print information may be determined according to the coordinates. Thus, the objective of palm print identification can be achieved by displaying the palm print information matched with the specific position on the screen.

It should be noted that: firstly, the first period and the second period are different periods, and the first period occurs before the second period. In the first period, no signal is inputted into the detection scanning lines Scan3. In the second period, no signal is inputted into the identification scanning lines Scan2.

Secondly, in these two periods, no signal is inputted into the display scanning lines Scan1, so that signal interference can be avoided.

The first period may be located after the display period of one frame, and the second period may be located after the display period of a next frame.

In the embodiments of the present disclosure, in one aspect, the photosensitive identification unit 102 and the capacitive detection unit 103 are integrated on the array substrate, so that the array substrate can have the function of palm print identification. When the array substrate is applied in the display device, the display device may have a simple structure. In another aspect, as position information of the palm may be acquired by the photosensitive identification unit 102, palm print identification may be only executed within a range of the palm position, so that the time of palm print identification can be shortened.

The embodiments of the present disclosure further provide a display panel, which comprises the above array substrate, and of course, may further comprise an opposing substrate and a liquid crystal layer disposed between the array substrate and the opposing substrate.

Figure 5:
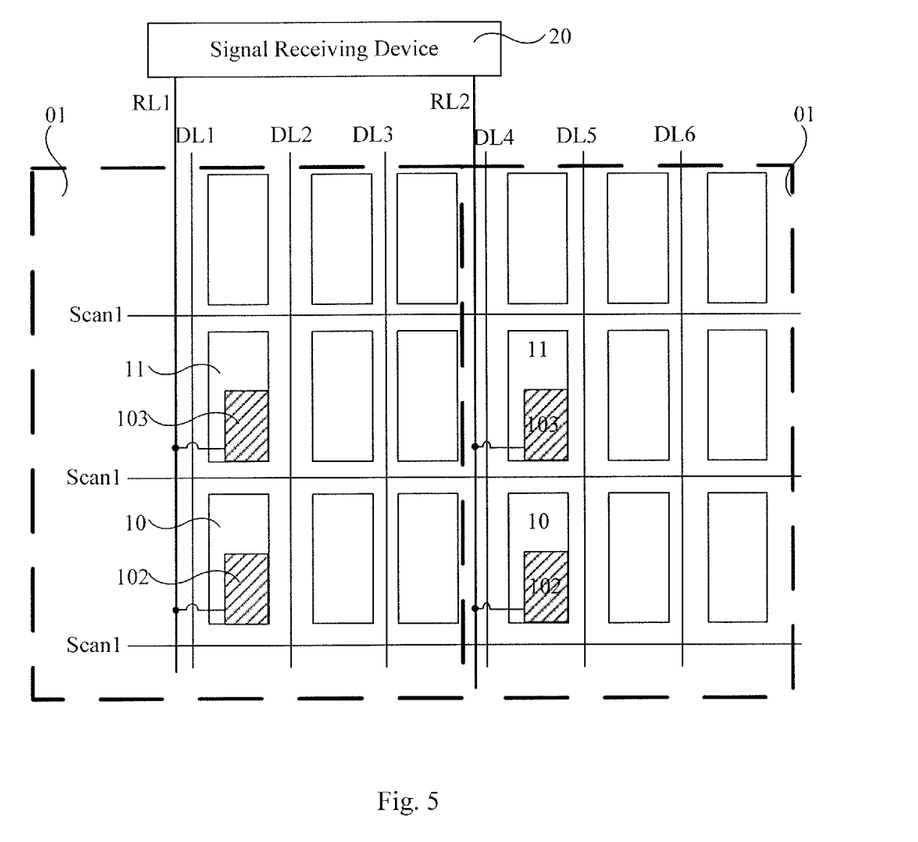
FIG. 5 is a schematic structural view of a display device provided by an embodiment of the present disclosure.

Moreover, the present disclosure further provides a display device, which comprises the display panel and a signal receiving device 20 (as shown in FIG. 5) connected with the read signal lines. The signal receiving device 20 is configured to receive palm print information outputted by the read signal lines.

For instance, the signal receiving device 20 may be connected with the photosensitive identification unit 102 in the first subpixel 10 and the capacitive detection unit 103 in the second subpixel 11 through the read signal lines respectively, e.g., a first read signal line RL1 and a second read signal line RL2 in FIG. 5. Description will be given below to a specific receiving process of the signal receiving device 20.

In the first period, when the palm makes contact with the screen, the photosensitive identification unit 102 acquires the position information of the palm. When the second transistor T2 (photosensitive transistor) receives light intensity variation, the electric potential of one end of the second capacitor C2 connected with the second end of the second transistor T2 changes, and this signal is transmitted to the read signal line RL through the third transistor T3; the signal receiving device 20 receives the signal outputted by the read signal line RL, amplifies the signal and compares the signal with the non-touch threshold; and hence the signal receiving device 20 determines whether the first subpixel 10 is covered by the palm, and determines the palm position according to the coordinates of the first subpixel 10 within the palm covering range.

In the second period, when the palm makes contact with the screen, the capacitive detection unit 103 acquires the palm information. The palm information is relevant to the concave portion (valley line) and the convex portion (crest line) of the palm print. If there is an amplified signal at the second end of the fifth transistor T5, the acquired palm print information is the concave portion of the palm print. When the sixth transistor T6 is switched on, and if the fifth transistor T5 is in the turn-on state as shown in FIG. 4*b*, the signal on the common voltage port Vcom is amplified by the fifth transistor T5 and transmitted to the read signal line RL through the sixth transistor T6; the signal receiving device 20 receives the amplified signal outputted by the read signal line RL and identifies the signal; and hence the second subpixel 11 displays the concave portion of the palm print according to the coordinates of the acquired palm print information.

When the palm makes contact with the screen, the capacitive detection unit 103 acquires the palm print information. If there is an initial current signal at the second end of the fifth transistor T5, the acquired palm print information is the convex portion of the palm print. When the sixth transistor T6 is switched on, and if the fifth transistor 15 is in the turn-off state as shown in FIG. 4*c*, the initial current signal at the second end of the fifth transistor T5 will be transmitted to the read signal line RL through the sixth transistor T6; the signal receiving device 20 receives the initial current signal outputted by the read signal line RL and identifies the signal; and hence the second subpixel 11 displays the convex portion of the palm print according to the coordinates of the acquired palm print information.

The foregoing is only one example of the signal receiving device 20. No further description will be given to other structures having the same function as the signal receiving device 20. But all the examples shall fall within the scope of protection of the present disclosure.

In addition, FIG. 5 only illustrates that one area 01 includes three pixel units. Each of the pixel units includes three subpixels, where a first subpixel 10 and a second subpixel 11 are respectively disposed in different pixel units. But the embodiments of the present disclosure are not limited thereto. The photosensitive identification unit 102 and the capacitive detection unit 103 may be arranged according to the size of the pixel units with appropriate cycle distribution. No limitation will be given here.

Figure 6:
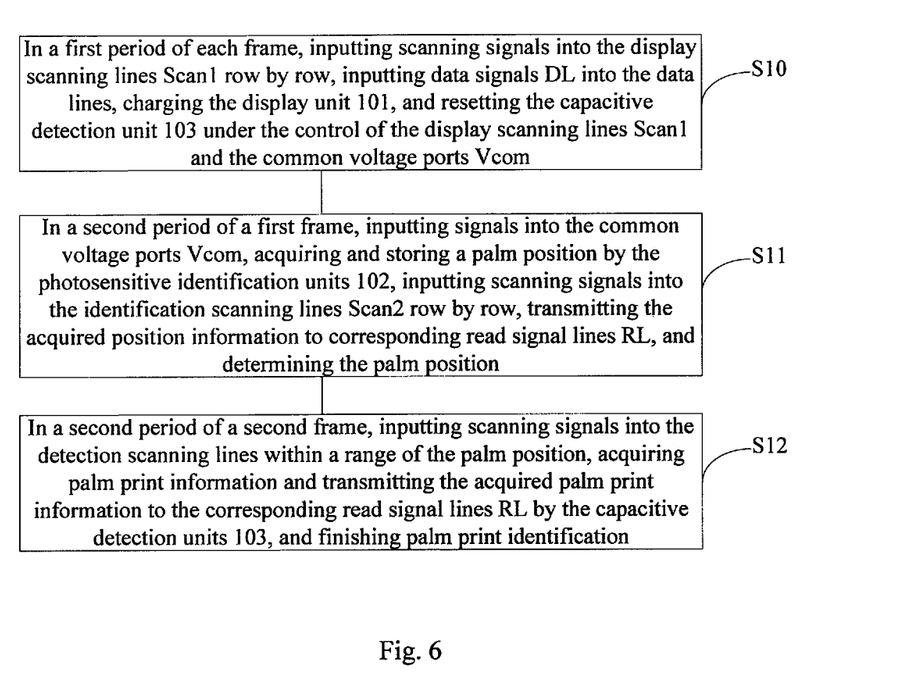
FIG. 6 is a flowchart of a method for driving an array substrate provided by an embodiment of the present disclosure.

The embodiments of the present disclosure further provide a driving method for driving the array substrate. As illustrated in FIG. 6, the driving method comprises the following steps:

S10: in a first period of each frame, inputting scanning signals into the display scanning lines Scan1 row by row, inputting data signals DL into the data lines, charging the display unit 101, and resetting the capacitive detection unit 103 under the control of the display scanning lines Scan1 and the common voltage ports Vcom.

S11: in a second period of a first frame, inputting signals into the common voltage ports Vcom, acquiring and storing a palm position by the photosensitive identification units 102, inputting scanning signals into the identification scanning lines Scan2 row by row, transmitting the acquired position information to corresponding read signal lines RL, and determining the palm position.

S12: in a second period of a second frame, inputting scanning signals into the detection scanning lines within a range of the palm position, acquiring palm print information and transmitting the acquired palm print information to the corresponding read signal lines RL by the capacitive detection units 103, and finishing palm print identification.

The embodiments of the present disclosure provide a driving method. In the first period of each frame, data signals are inputted into the display unit 101 through the data lines DL under the control of the display scanning lines Scan1, so that normal image display can be achieved when the array substrate is applied in the display device. In the second period of the first frame, voltage signals are inputted through the common voltage port Vcom under the control of the identification scanning lines Scan2, and the photosensitive identification units 102 may acquire the position information of the palm and transmit the position information to the corresponding read signal lines RL, so that the objective of palm position identification can be achieved. On this basis, in the second period of the second frame, the capacitive detection units 103 may be adopted to acquire the palm print information under the control of the detection scanning lines Scan3 within the range of the palm position, and transmit the acquired palm print information to the corresponding read signal lines RL, so that the objective of palm print identification can be achieved. Therefore, in one aspect, the photosensitive identification units 102 and the capacitive detection units 103 are integrated on the array substrate, so that the array substrate can have the function of palm print identification. When the array substrate is applied to a display device, the display device may have a simple structure. In another aspect, as the palm position information may be acquired by the photosensitive identification units 102, palm print identification may only be executed within the range of the palm position, so that the time of palm print identification can be shortened.

For instance, in the first period of each frame, when scanning signals are inputted into the display scanning lines Scan1 row by row, the first transistors T1 connected with the respective display scanning lines are switched on respectively. The first capacitor C1 (pixel electrode) is charged by a signal inputted through the data line DL; a voltage difference is generated between the first capacitor C1 and the common electrode, so that liquid crystals are driven to deflect for display when the array substrate is applied to the display device. Meanwhile, when a scanning signal is inputted into the display scanning line connected with the capacitive detection unit 103, the fourth transistor T4 is switched on, and the third capacitor C3 is reset by the voltage of the common voltage port Vcom through the fourth transistor T4.

In the second period of the first frame, a signal is inputted into the common voltage port Vcom, and the second transistor T2 (photosensitive transistor) is switched on. In the case of palm covering, the electric potential difference of the second capacitor C2 changes; scanning signals are inputted into the identification scanning lines Scan2 row by row, and the third transistor T3 is switched on; a signal for indicating the electric potential difference is transmitted to the read signal line RL through the third transistor T3; and the palm position is determined.

Here, when there is a palm covering at the position corresponding to the photosensitive identification unit 102, the second transistor T2 (photosensitive transistor) receives light intensity variation, causing the electric potential of one end of the second capacitor C2 connected with the second end of the second transistor T2 to change, so that the electric potential difference of the second capacitor C2 is varied. On this basis, the signal receiving device connected with the read signal line RL, for instance, may determine whether there is a palm covering at this position by comparing the electric potential difference of the second capacitor C2 caused by the palm covering with the non-touch threshold.

In the second period of the second frame, a coupling capacitor Cf is formed between the concave portion (valley line) of the palm print and the detection electrode D, so that the fifth transistor T5 is switched on; or, a coupling capacitor Cf is formed between the convex portion (crest line) of the palm print and the detection electrode D, so that the fifth transistor T5 is switched off; scanning signals are inputted into the detection scanning lines Scan3 within the range of the palm position, and the sixth transistor T6 is switched on; when the fifth transistor T5 is in the turn-on state, a signal inputted into the common voltage port Vcom is amplified by the fifth transistor T5 and transmitted to the read signal line RL through the sixth transistor T6; and when the fifth transistor T5 is in the turn-off state, the initial current signal at the second end of the fifth transistor T5 is transmitted to the read signal line through the sixth transistor T6.

When the palm makes contact with a screen, in the touch process as illustrated in FIG. 4a, a coupling capacitor Cf is formed between the concave portion (valley line) of the palm and the detection electrode D. On this basis, as illustrated in FIG. 4b, apart from the third capacitor C3 which serves as a reference capacitor in the capacitive detection unit 103, the fifth transistor T5 which has an amplifying function further includes a parasitic capacitor Ct. On this basis, as the coupling capacitor Cf is small enough compared with the third capacitor C3 and the parasitic capacitor Ct of the fifth transistor T5 having the amplifying function, as illustrated in FIG. 4b, the electric potential of the gate electrode of the fifth transistor T5 can be increased. As the fifth transistor T5 is an N-type transistor, the fifth transistor T5 is in an amplification turn-on state, and the signal on the common voltage port Vcom can be amplified by the fifth transistor T5 and transmitted to the read signal line RL through the sixth transistor T6 which is in a turn-on state.

Or, in the touch process as illustrated in FIG. 4a, a coupling capacitor Cf is formed between the convex portion (crest line) of the palm and the detection electrode D. On this basis, as illustrated in FIG. 4c, apart from the third capacitor C3 which serves as a the reference capacitor in the capacitive detection unit 103, the fifth transistor T5 having an amplifying function further includes a parasitic capacitor Ct. On this basis, as the coupling capacitor Cf is large enough compared with the third capacitor C3 and the parasitic capacitor Ct of the fifth transistor T5 having the amplifying function, as illustrated in FIG. 4c, the electric potential of the gate electrode of the fifth transistor T5 can be reduced. As the fifth transistor T5 is an N-type transistor, the fifth transistor T5 is in a turn-off state. An initial current signal exists at the second end of the fifth transistor T5 and is transmitted to the read signal line RL through the sixth transistor T6 which is in a turn-on state.

Here, as the capacitive detection unit 103 has been reset in the display period, the influence of accumulated capacitance of the third capacitor C3 on the state of the fifth transistor T5 can be avoided in the working process of the capacitive detection unit 103.

Thus, when all the detection scanning lines Scan3 are sequentially scanned, the capacitive detection unit 103 completes the acquisition of the palm print information. The palm print information is related to the concave portions and the convex portions of the palm print. When there is an initial current signal at the second end of the fifth transistor T5, the acquired palm print information is a convex portion of the palm print; and when there is an amplified signal at the second end of the fifth transistor T5, the acquired palm print information is a concave portion of the palm print.

The detection scanning line Scan3 serves as a horizontal coordinate of the subpixel corresponding to the above palm print information (the concave portion or convex portion), and the read signal line RL serves as a vertical coordinate of the subpixel corresponding to the above palm print information (the concave portion or convex portion). A specific position on the screen corresponding to the palm print information may be determined according to the coordinates. Thus, the objective of palm print identification can be achieved by displaying the palm print information matched with the specific position on the screen.

On this basis, the function of palm print identification can be achieved simultaneously with display by continuous cycles of the first frame and the second frame.

It should be noted that, in the drawings, the size of a layer or an area may be exaggerated for clarity of the drawings. Besides, it is understandable that if an element or a layer is said to be "under" another element or layer, it can be directly under the other element or an intermediate layer may exist therebetween. Besides, it is understandable that if a layer or an element is said to be "between" two layers or "between" two elements, it can be the only one layer or element between the two layers or two elements, or one or more intermediate layer or element can exist. Similar reference marks in the full text refer to the similar elements.

In the present disclosure, terms such as "first", "second" and the like used in the present disclosure do not indicate any sequence, quantity or significance but only for distinguishing different constituent parts. Also, the terms such as "a," "an," or "the" etc., are not intended to limit the amount, but indicate the existence of at lease one. The terms "comprises," "comprising," "includes," "including," etc., are intended to specify that the elements or the objects stated before these terms encompass the elements or the objects and equivalents thereof listed after these terms, but do not preclude the other elements or objects.

It is noted that, azimuth or positional relationships indicated by terms such as "up" and "down" and so on, are azimuth or positional relationships based on the drawings, which are only to facilitate description of the embodiments of the present disclosure and simplify the description, but not to indicate or imply that the devices or components must have a specific azimuth, or be constructed or operated in the specific azimuth, which thus cannot be understood as a limitation to the embodiments of the present disclosure. Unless otherwise clearly defined and limited, terms such as "installed", "coupled", "connected" should be broadly interpreted, for example, it may be fixedly connected, or may be detachably connected, or integrally connected; it may be mechanically connected, or may be electrically connected; it may be directly connected, or may be indirectly connected via an intermediate medium. Those skilled in the art can understand the specific meanings of the above-mentioned terms in the embodiments of the present disclosure according to the specific circumstances.

The foregoing are merely specific embodiments of the disclosure, but not limitative to the protection scope of the disclosure. One skilled in the art could devise variations or replacements that within the scope and the spirit of the present disclosure, those variations or replacements shall belong to the protection scope of the disclosure. Thus, the protection scope of the disclosure shall be defined by the accompanying claims.

The present disclosure claims the benefits of Chinese patent application No. 201510342538.5, which was filed on Jun. 18, 2015 and is incorporated herein in its entirety by reference as part of this application.

What is claimed is:

1. An array substrate, comprising a plurality of areas, wherein each area at least includes a first subpixel and a second subpixel, and each subpixel includes a corresponding display unit;
the first subpixel includes a photosensitive identification unit, the photosensitive identification unit is connected with a read signal line and is configured to obtain a light intensity variation, acquire and store position information of a touch position based on the light intensity variation and transmit the acquired position information to the read signal line; and
the second subpixel includes a capacitive detection unit, the capacitive detection unit is connected with the read signal line, and the capacitive detection unit is configured to, based on the touch position obtained through the light intensity variation, acquire print information of a touch object within a range of the touch position and transmit the acquired print information of the touch object to the read signal line.

2. The array substrate according to claim 1, wherein:
the first subpixel further includes a first display unit which is connected with a first display scanning line, a first data line and a common voltage port, and the first display unit is configured to store a data signal inputted into the first data line under the control of the first display scanning line and the common voltage port;
the second subpixel further includes a second display unit which is connected with a second display scanning line, a second data line and the common voltage port, and the second display unit is configured to store a data signal inputted into the second data line under the control of the second display scanning line and the common voltage port;
the photosensitive identification unit is also connected with an identification scanning line and the common voltage port, and is configured to acquire and store the position information of the touch position under the control of the common voltage port and transmit the acquired position information to the read signal line under the control of the identification scanning line; and
the capacitive detection unit is also connected with a third display scanning line, a detection scanning line and the common voltage port, and is configured to reset under the control of the third display scanning line and the common voltage port, acquire the print information of the touch object under the control of the detection scanning line, and transmit the acquired print information of the touch object to the read signal line.

3. The array substrate according to claim 1, wherein each display unit includes a first transistor and a first capacitor;
a gate electrode of the first transistor is connected with a corresponding display scanning line; a first end of the first transistor is connected with a corresponding data line; a second end of the first transistor is connected with one end of the first capacitor; and
another end of the first capacitor is connected with the common voltage port.

4. The array substrate according to claim 2, wherein the photosensitive identification unit includes a second transistor, a third transistor and a second capacitor;
both a gate electrode and a first end of the second transistor are connected with the common voltage port, and a second end of the second transistor is connected with a first end of the second capacitor;
a gate electrode of the third transistor is connected with the identification scanning line; a first end of the third transistor is connected with the first end of the second capacitor; a second end of the third transistor is connected with the read signal line;
a second end of the second capacitor is connected with the common voltage port; and
the second transistor is a photosensitive transistor.

5. The array substrate according to claim 2, wherein the capacitive detection unit includes a fourth transistor, a fifth transistor, a sixth transistor, a third capacitor and a detection electrode;
a gate electrode of the fourth transistor is connected with the third display scanning line; a first end of the fourth transistor is connected with the common voltage port; a second end of the fourth transistor is connected with a first end of the third capacitor;
a gate electrode of the fifth transistor is connected with the first end of the third capacitor; a first end of the fifth transistor is connected with the common voltage port; a second end of the fifth transistor is connected with a first end of the sixth transistor;
a gate electrode of the sixth transistor is connected with the detection scanning line, and a second end of the sixth transistor is connected with the read signal line;
the detection electrode is connected with one end of the third capacitor;
a second end of the third capacitor is connected with the third display scanning line; and
the fifth transistor is an amplifier transistor.

6. A display panel, comprising the array substrate according to claim 1.

7. A display device, comprising the display panel according to claim 6 and a signal receiving device connected with the read signal line,
wherein the signal receiving device is configured to receive the position information and the print information of the touch object outputted by the read signal line.

8. A driving method for driving the array substrate according to claim 1, comprising:
in a first period of each frame, inputting scanning signals into display scanning lines row by row, inputting data signals into data lines to charge corresponding display units, and resetting capacitive detection units under the control of common voltage ports and display scanning lines connected with the capacitive detection units;
in a second period of a first frame, inputting signals into the common voltage ports, acquiring and storing position information of a touch position by photosensitive identification units, inputting scanning signals into identification scanning lines row by row, and transmitting the acquired position information to read signal lines for determination of the touch position; and
in a second period of a second frame, inputting scanning signals into detection signal lines within a range of the touch position, acquiring information of a touch object and transmitting the acquired information of the touch object to the read signal lines by capacitive detection units, and finishing identification of the touch object.

9. The driving method according to claim 8, wherein:
in the first period of each frame, when the scanning signals are inputted into the respective display scanning lines row by row, first transistors connected with the respective display scanning lines are switched on, and first capacitors are charged by signals inputted through the corresponding data lines; and when the scanning signals are inputted into corresponding display scanning lines connected with the capacitive detection units, fourth transistors are switched on, and third capacitors are reset by voltages on the common voltage ports through the fourth transistors.

10. The driving method according to claim 8, wherein:
in the second period of the first frame, signals are inputted into the common voltage ports, and second transistors are switched on; in a case of covering by the touch object, electric potential differences of second capacitors are varied; scanning signals are inputted into the identification scanning lines row by row, and third transistors are switched on; signals indicating the electric potential differences are transmitted to the read signal lines through the third transistors; and the touch position is determined.

11. The driving method according to claim 8, wherein the touch position is a palm position, and the information of the touch object is palm print information;
in the second period of the second frame, coupling capacitors are formed between concave portions of the palm print and a detection electrode to cause fifth transistors to be switched on; or, coupling capacitors are formed between convex portions of the palm print and the detection electrode to cause the fifth transistors to be switched off;
when scanning signals are inputted into detection scanning lines within the range of the palm position, sixth transistors are switched on; when the fifth transistors are switched on, signals inputted through the common voltage ports are amplified by the fifth transistors and transmitted to the read signal lines through the sixth transistors; and when the fifth transistors are switched off, initial current signals at second ends of the fifth transistors are transmitted to the read signal lines through the sixth transistors, and palm print identification is finished.

12. The array substrate according to claim 2, wherein the third display scanning line connected with the capacitive detection unit is any scanning line in a corresponding area.

13. The array substrate according to claim 2, wherein the second display scanning line connected with the second display unit and the third display scanning line connected with the capacitive detection unit are different display scanning lines.

14. The array substrate according to claim 2, wherein the first display scanning line connected with the first display unit and the third display scanning line connected with the capacitive detection unit are different display scanning lines.

15. The array substrate according to claim 2, wherein the first data line and the second data line are different data lines.

16. The array substrate according to claim 2, wherein each display unit includes a first transistor and a first capacitor;
a gate electrode of the first transistor is connected with a corresponding display scanning line; a first end of the first transistor is connected with a corresponding data line; a second end of the first transistor is connected with one end of the first capacitor; and
another end of the first capacitor is connected with the common voltage port.

17. The array substrate according to claim 2, wherein the second display scanning line connected with the second display unit and the third display scanning line connected with the capacitive detection unit are a same scanning line.

18. The array substrate according to claim 2, wherein the first display scanning line connected with the first display unit and the third display scanning line connected with the capacitive detection unit are a same scanning line.

19. The array substrate according to claim 2, wherein the first data line and the second data line are a same data line.

20. An array substrate, comprising a plurality of areas, wherein each area at least includes a first subpixel and a second subpixel, and each subpixel includes a corresponding display unit;
the first subpixel includes a photosensitive identification unit, the photosensitive identification unit is connected with a read signal line and is configured to acquire and store position information of a touch position and transmit the acquired position information to the read signal line;
the second subpixel includes a capacitive detection unit, the capacitive detection unit is connected with the read signal line and is configured to acquire information of a touch object and transmit the acquired information of the touch object to the read signal line;
the first subpixel further includes a first display unit which is connected with a first display scanning line, a first data line and a common voltage port, and the first display unit is configured to store a data signal inputted into the first data line under the control of the first display scanning line and the common voltage port;
the second subpixel further includes a second display unit which is connected with a second display scanning line, a second data line and the common voltage port, and the second display unit is configured to store a data signal inputted into the second data line under the control of the second display scanning line and the common voltage port;
the photosensitive identification unit is also connected with an identification scanning line and the common voltage port, and is configured to acquire and store the position information of the touch position under the control of the common voltage port and transmit the acquired position information to the read signal line under the control of the identification scanning line;
the capacitive detection unit is also connected with a third display scanning line, a detection scanning line and the common voltage port, and is configured to reset under the control of the third display scanning line and the common voltage port, acquire the information of the touch object under the control of the detection scanning line, and transmit the acquired information of the touch object to the read signal line;
the capacitive detection unit includes a fourth transistor, a fifth transistor, a sixth transistor, a third capacitor and a detection electrode;
a gate electrode of the fourth transistor is connected with the third display scanning line; a first end of the fourth transistor is connected with the common voltage port; a second end of the fourth transistor is connected with a first end of the third capacitor;
a gate electrode of the fifth transistor is connected with the first end of the third capacitor; a first end of the fifth transistor is connected with the common voltage port; a second end of the fifth transistor is connected with a first end of the sixth transistor;

a gate electrode of the sixth transistor is connected with the detection scanning line, and a second end of the sixth transistor is connected with the read signal line;

the detection electrode is connected with one end of the third capacitor;

a second end of the third capacitor is connected with the third display scanning line; and the fifth transistor is an amplifier transistor.

\* \* \* \* \*